(12) United States Patent
Shajii et al.

(10) Patent No.: US 6,986,359 B2
(45) Date of Patent: Jan. 17, 2006

(54) SYSTEM AND METHOD FOR CONTROLLING PRESSURE IN REMOTE ZONES

(75) Inventors: Ali Shajii, Canton, MA (US); Siddharth P. Nagarkatti, Acton, MA (US)

(73) Assignee: MKS Instruments, Inc., Wilmington, MA (US)

( * ) Notice: Subject to any disclaimer, the term of this patent is extended or adjusted under 35 U.S.C. 154(b) by 0 days.

(21) Appl. No.: 10/796,723

(22) Filed: Mar. 9, 2004

(65) Prior Publication Data

US 2005/0199287 A1 Sep. 15, 2005

(51) Int. Cl.
*G05D 16/20* (2006.01)
*B24B 51/00* (2006.01)

(52) U.S. Cl. .................................. 137/14; 137/487.5
(58) Field of Classification Search .............. 137/14, 137/487.5
See application file for complete search history.

(56) References Cited

U.S. PATENT DOCUMENTS

| | | | |
|---|---|---|---|
| 5,551,770 A * | 9/1996 | Hrovat et al. | 303/167 |
| 5,916,016 A * | 6/1999 | Bothra | 451/398 |
| 5,964,653 A | 10/1999 | Perlov et al. | |
| 5,980,361 A * | 11/1999 | Muller et al. | 451/9 |
| 6,277,009 B1 | 8/2001 | Chen et al. | |
| 6,435,956 B1 | 8/2002 | Ohwada et al. | |
| 6,506,105 B1 | 1/2003 | Kajiwara et al. | |
| 2002/0142704 A1 | 10/2002 | Hu et al. | |
| 2004/0118403 A1* | 6/2004 | O'Connor et al. | 128/204.23 |

\* cited by examiner

*Primary Examiner*—Ramesh Krishnamurthy
(74) *Attorney, Agent, or Firm*—McDermott Will & Emery LLP (57) ABSTRACT

A system for controlling fluid flow through i lines, wherein the i lines are connectable through tubing to i zones, respectively, and wherein i=1, 2, . . . , N. The system includes at least one valve and a pressure transducer in each of the i lines, a control device for controlling the valves, and a zone pressure estimator. The zone pressure estimator is connected to the pressure transducers and is programmed to calculate an estimated pressure in each the i zones and provide the estimated pressures to the control device.

35 Claims, 5 Drawing Sheets

FIG. 7 ystem and Method for Controlling Pressure in Remote Zones

FIELD OF THE INVENTION

The present disclosure relates generally to pressure control systems and, more particularly, to a system and a method for pressurizing and evacuating remote chambers or zones, such as remote zones found in semiconductor processing equipment. The remote zones may have rigid walls or flexible walls, and may be coupled or non-coupled.

BACKGROUND OF THE DISCLOSURE

Many machines and equipment include chambers, or zones that are pressurized or evacuated during operation of the equipment. As discussed herein, a zone is equivalent to an enclosed volume. The remote zones may have flexible walls or rigid walls and, may be coupled or non-coupled to each other.

The coupling between the various zones can comprise volumetric coupling that occurs when the zone walls are flexible and one zone expands and pushes against another zone. Outlet coupling occurs if a vacuum pressure connected to the zones drifts, causes outlet flows to change and results in flows transitioning. Inlet coupling occurs when there is a significant in-rush of flow into a manifold resulting in a drop of line pressure (transient behavior) that affects all the other zones fed by the same source.

Chemical mechanical polishing (CMP) machines are examples of machines that include zones that are pressurized or evacuated during use. CMP is a method of planarizing substrates, particularly silicon wafers, as part of semiconductor manufacturing processes. Such substrates are generally formed by the sequential deposition of conductive, semiconductive or insulative layers, and subsequent etching of the layers to create circuitry features. As a series of layers are sequentially deposited and etched, the outer or uppermost surface of the substrate becomes increasingly non-planar. There is a need, therefore, to periodically planarize the substrate surface.

The planarization method typically requires that the substrate be mounted on a carrier or polishing head of a CMP machine. The exposed surface of the substrate is placed against a rotating polishing pad of the carrier head, and the carrier head provides a controllable pressure on the substrate to push it against the polishing pad. A polishing slurry, including at least one chemically-reactive agent and, in some cases, abrasive particles, is supplied to the surface of the rotating polishing pad.

Internal chambers or zones of a typical carrier head are formed at least in part by resilient bladders which expand upon the zones being pressurized and which contract upon a vacuum being created by evacuation within the zones. For example, pressurizing a zone in the carrier head can be used to press a substrate against a rotating polishing pad, while creating a vacuum in the zone can be used to provide suction for holding the substrate against the carrier head during transfer of the substrate to and from the polishing pad. The pressure in each zone can be controlled such that the polishing pad applies a desired force on the substrate held by the carrier head.

A pneumatic control system for controlling pressure within the remote zones of the carrier head can include flow control lines having pressure transducers and controllable valves. The flow control lines of the pneumatic control system may be connected to the zones of the carrier head through relatively long tubing, e.g., one meter or more. The pneumatic control system connects the zones of the carrier head to at least one vacuum source and at least one pressure source, and is appropriately connected to a computer that is programmed to receive measurements from the pressure transducer, and command the valves to alternatively connect the remote zones of the carrier head to the vacuum source and the pressure source and, thus, pneumatically power the carrier head.

One problem associated with the pneumatic control system of the prior art is that the system relies solely on the pressure measured by the transducers placed in the flow control lines of the pneumatic control system. The transducers can only measure the pressure in the system and not in the remotely connected zones of the carrier head. As a result, the control system assumes that the pressures in the pneumatic control system are the same as that in the remotely connected zones of the carrier head. Such is clearly not the case, however, when localized pressure transients occur in the pneumatic control system, which leads to severe degradation of system performance.

What is still desired, therefore, is a new and improved pressure control system and method, which can be used for, but is not limited to, pressurizing and evacuating remotely connected zones, such as the chambers of a CMP carrier head, and that compensates for pressure measurements taken in lines remotely connected to the zones. Preferably, the new and improved pneumatic control system can be used for pressurizing and evacuating a multi-zone system, wherein the zones possess rigid or flexible walls, and wherein the zones are coupled or non-coupled.

SUMMARY OF THE DISCLOSURE

The present disclosure provides a model-based pressure observer that can be used with in any pressure control solution for a multi-zone system, where the number of zones can vary from i=1 to N. Furthermore, these zones may possess rigid or flexible walls and the zones may be coupled or non-coupled.

According to one exemplary embodiment of the present disclosure, a system for controlling fluid flow through i lines, wherein the i lines are connectable through tubing to i zones, respectively, and wherein i=1, 2, ..., N, is provided. The system includes at least one valve and a pressure transducer in each of the i lines, a control device for controlling the valves, and a zone pressure estimator for estimating pressures in the i zones.

The zone pressure estimator is connected to the pressure transducers and a first input device and is programmed to, receive a measured pressure ($P_b$) in the flow line from the pressure transducer, receive from the first input device constants ($C_{tube,i}$ and $\tau_{tube,i}$) associated with the tubing connecting the lines to the zones, a volume ($V_{z,i}$) of each zone, an initial volume ($V_{z0,i}$) of each zone under standard temperature and pressure (STP) conditions, a volume expansion/contraction time constant ($\tau_v$), an expansion/contraction coefficient ($\gamma_{ii}$) of zone i, and a coupling coefficient ($\gamma_{ij}$) between zone i and zone j, and calculate an nth sample of an estimated pressure of the zone i, where n is time dependent and the estimated pressure is calculated according to equations described in detail below.

The control device is connected to the valves of the lines, the zone pressure estimator and a second input device. The control device is programmed to receive an nth pressure set point for each of the i zones from the second input device, and receive the nth sample of the estimated pressure for each of the i zones from the zone pressure estimator. The control device is also programmed to compare the nth pressure set point for each of the i zones to the nth sample of the zone pressure estimate, and, if the nth sample does not equal the nth set point, operate the valve until the sample equals the set point.

According to one aspect of the present disclosure, all the zones of the multi-zone system are fed by a single source and dump into a single vacuum exhaust, volumes of the zones can expand and contract, and the volumes of the zones interact with (push against) each other.

Among other aspects and advantages of the present disclosure, the system can be used for, but is not limited to, pressurizing and evacuating remotely connected, multiple zones, such as the chambers of a CMP carrier head. The system compensates for pressure measurements taken in lines remotely connected to the zones, and can be used for pressurizing and evacuating a multi-zone system, wherein the zones possess rigid or flexible walls, and wherein the zones are coupled or non-coupled.

Additional aspects and advantages of the present disclosure will become readily apparent to those skilled in this art from the following detailed description, wherein an exemplary embodiment of the present disclosure is shown and described, simply by way of illustration. As will be realized, the present disclosure is capable of other and different embodiments and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

Reference is made to the attached drawings, wherein elements having the same reference characters represent like elements throughout, and wherein.

DETAILED DESCRIPTION OF EXEMPLARY EMBODIMENTS

Figure 1:
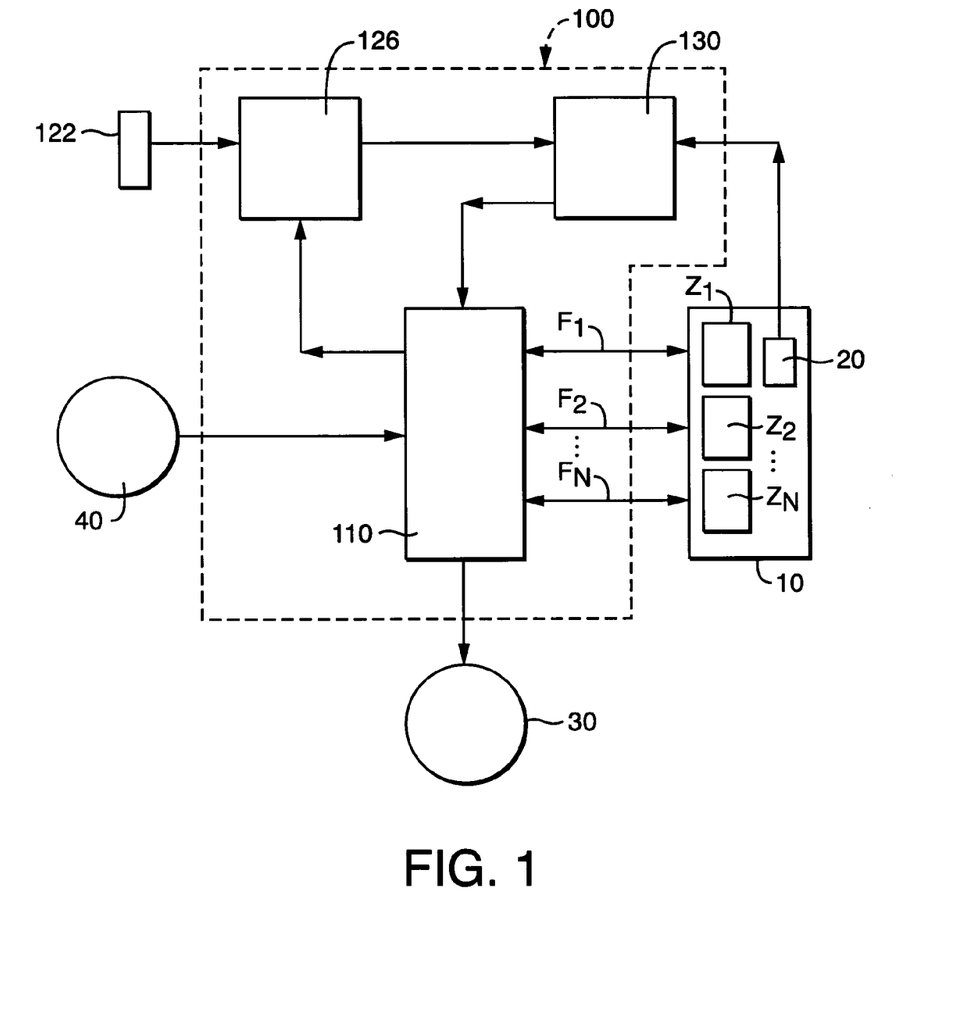
FIG. 1 is a diagram illustrating an exemplary embodiment of a system and method, constructed in accordance with the present disclosure, for controlling a pneumatic control system connecting a vacuum source and a pressure source to remote zones of a machine, such as a chemical-mechanical planarization (CMP) machine.

FIG. 1 shows an exemplary embodiment of a system 100, constructed in accordance with the present disclosure, for controlling a pneumatic manifold 110 connecting a vacuum source 30 and a pressure source 40 to remote zones $Z_i$ of a machine, such as a chemical-mechanical planarization (CMP) machine 10, where i=1 to N. The zones $Z_i$ may possess rigid or flexible walls, and the zones $Z_i$ may be coupled or non-coupled.

In addition to the manifold 110, the system 100 of FIG. 1 includes a zone pressure estimator 120, and a control device 130. The zone pressure estimator 120 and the control device 130 both comprise computers which may be provided separately or may be provided as an integrated unit. For example, the zone pressure estimator 120 of the present disclosure may be provided as a separate device and added to an existing pressure control system as an "aftermarket" piece, or could be provided as an integrated unit with the control device 130 in a newly manufactured pressure control system.

Figure 2:
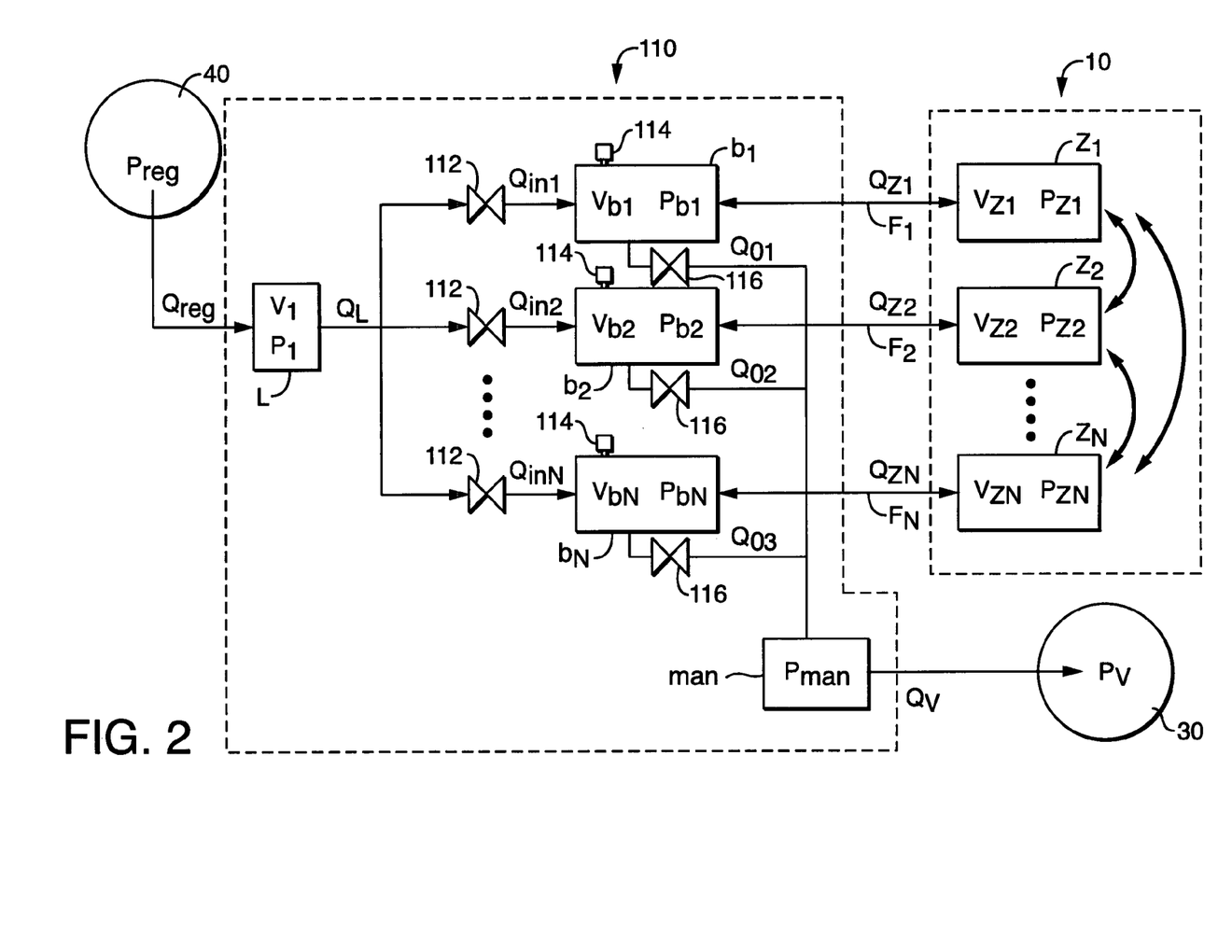
FIG. 2 is a diagram of an exemplary embodiment of a manifold of the system of FIG. 1, including flow control lines shown connecting the vacuum and the pressure sources to the remote zones, which, in the exemplary embodiment shown, are coupled among each other.

As shown in FIG. 2, the system manifold 110 includes flow control lines "$b_i$," where i=1 to N and corresponds to the number of remote zones $Z_i$. The flow control lines $b_i$ are connected between an inlet manifold "L" and a manifold "man" having a venturi, and connect the vacuum source 30 and the pressure source 40 to the remote zones $Z_i$. Each flow control line $b_i$ includes an inlet valve 112 for connecting the pressure source 40 to the remote zones $Z_i$, a pressure transducer 114 for measuring the pressure in the flow control lines $b_i$, and an outlet valve 116 for connecting the remote zones $Z_i$ to the vacuum source 30.

The zone pressure estimator 120 of FIG. 1 is programmed to receive pressure measurements from the transducers 114 of the system manifold 110, as shown in FIG. 2, and receive physical parameters of the system 100. The physical parameters may be entered through a first input device 122, as shown in FIG. 1, by an operator. The input device 122 can comprise a keyboard, a mouse and a monitor, for example. The zone pressure estimator 120 is further programmed to use the pressure measurements and the physical parameters to calculate and provide pressure estimates for each zone $Z_i$ using an algorithm described in greater detail below.

The system control device 130 of FIG. 1 is programmed to receive the zone pressure estimates from the zone pressure estimator 120, and receive pressure set points for each of the remote zones $Z_i$, and use the zone pressure estimates and the pressure set points to control the valves 112, 116 of the system manifold 110, as shown in FIG. 2. The pressure set points can be entered by an operator using a second input device (or the first input device) and/or can be entered by a control device 20 of the processing machine 10, as shown in FIG. 1.

In the exemplary embodiment of FIG. 2, all the zones $Z_i$ are fed by a single pressure source 40 and dump into a single vacuum exhaust 30. The remote zones $Z_i$ have volumes that can expand and contract, and the volumes of the zones $Z_i$ interact with (push against) each other.

Figure 3:
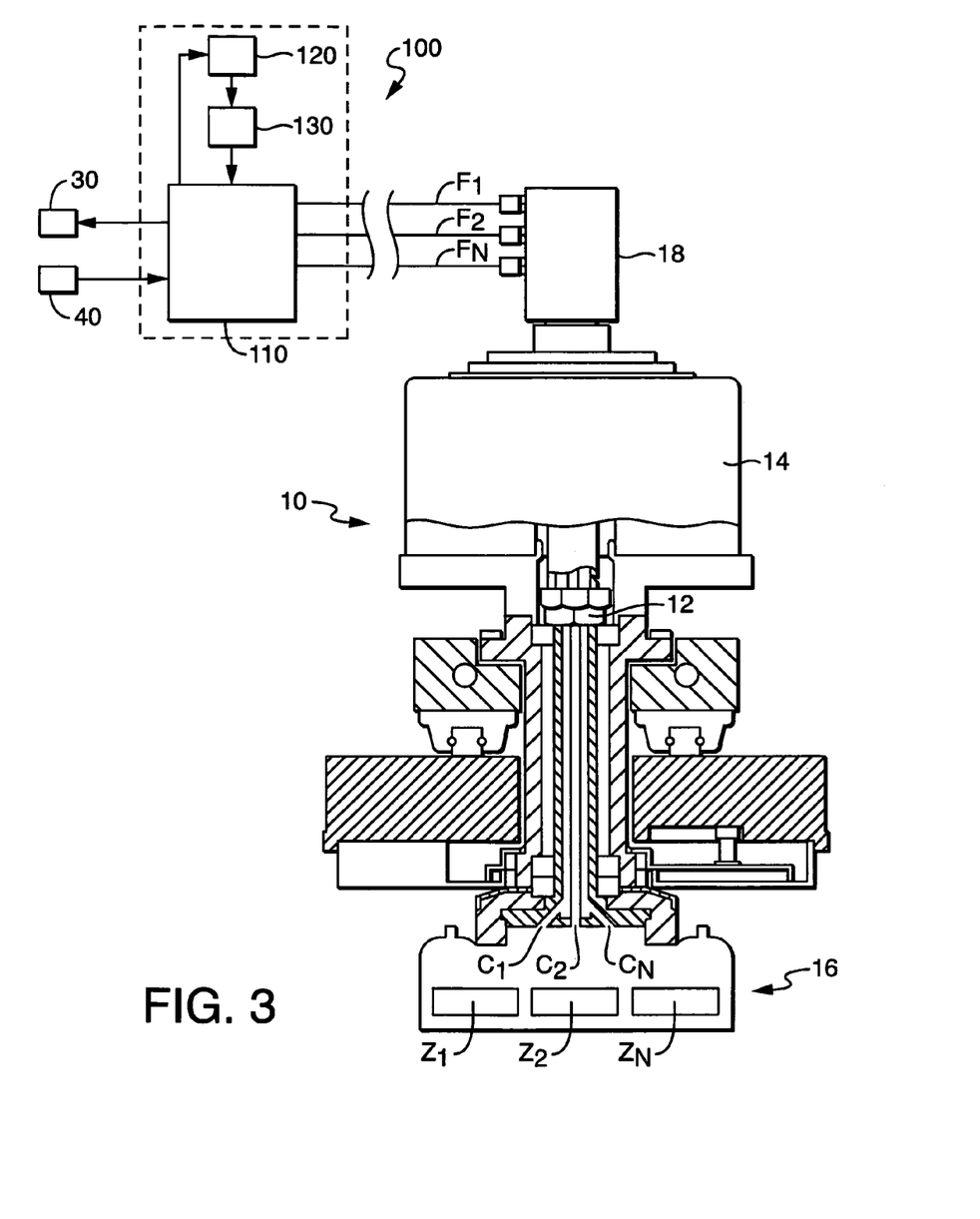
FIG. 3 is a side elevation view, partially in section, of an example of a CMP machine including remote zones connected through a rotary union to the pneumatic control system of FIG. 1.
Figure 4:
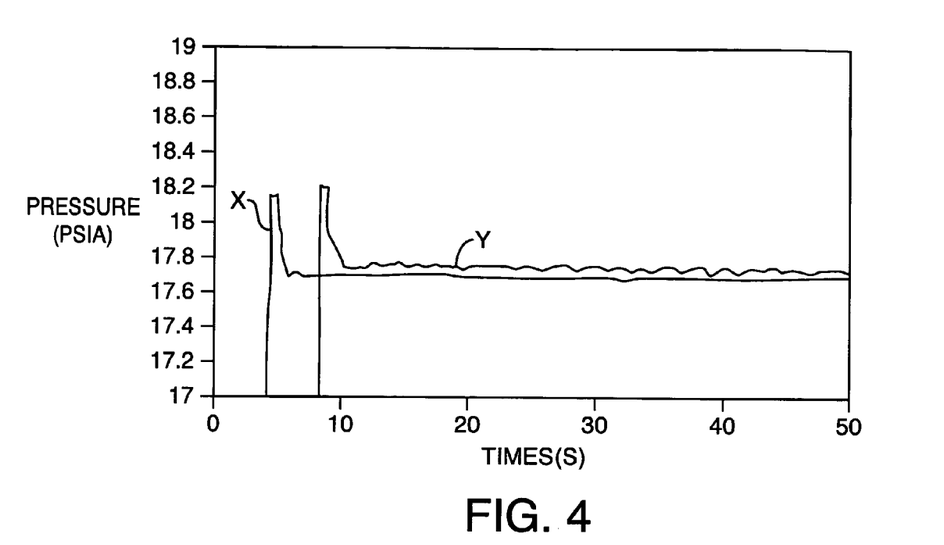
FIGS. 4 through 7 are graphs illustrating pressure response times for various volumes and pressures for the pneumatic control system of FIG. 1, and a pneumatic control system of the prior art.
Figure 5:
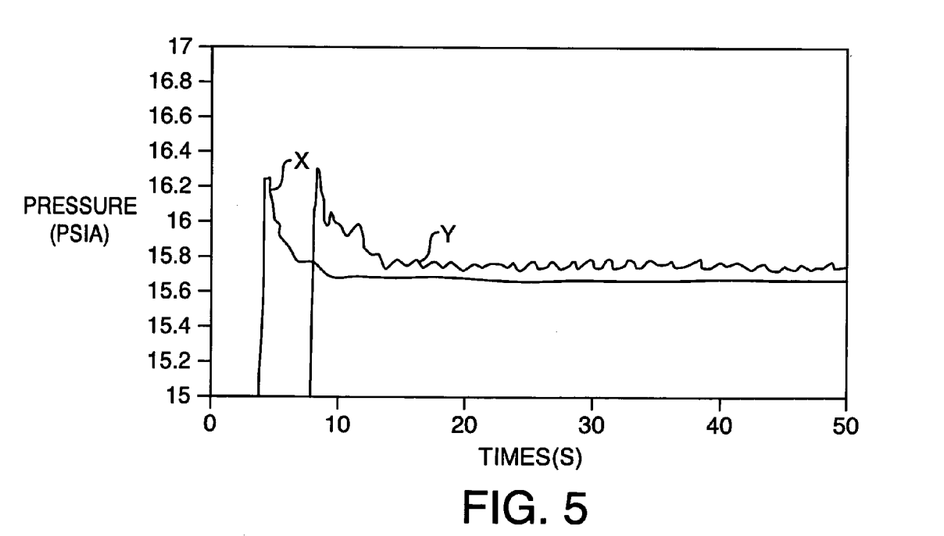
Figure 6:
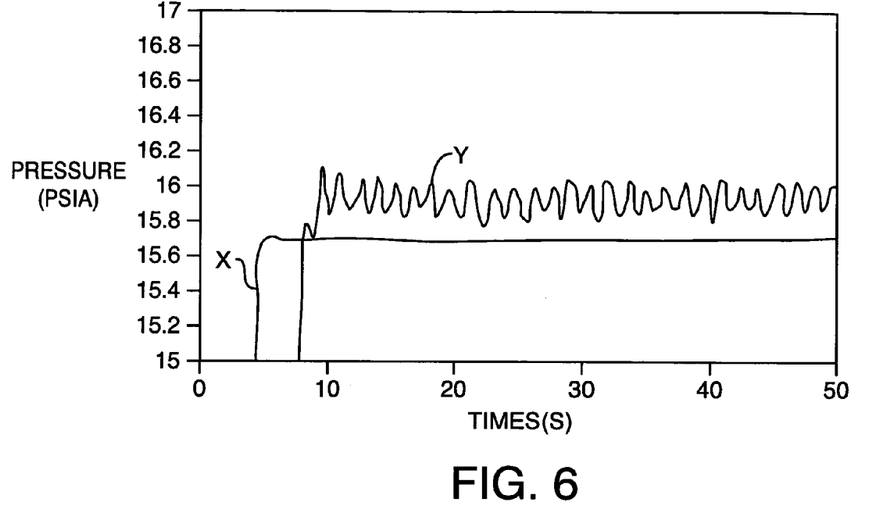
Figure 7:
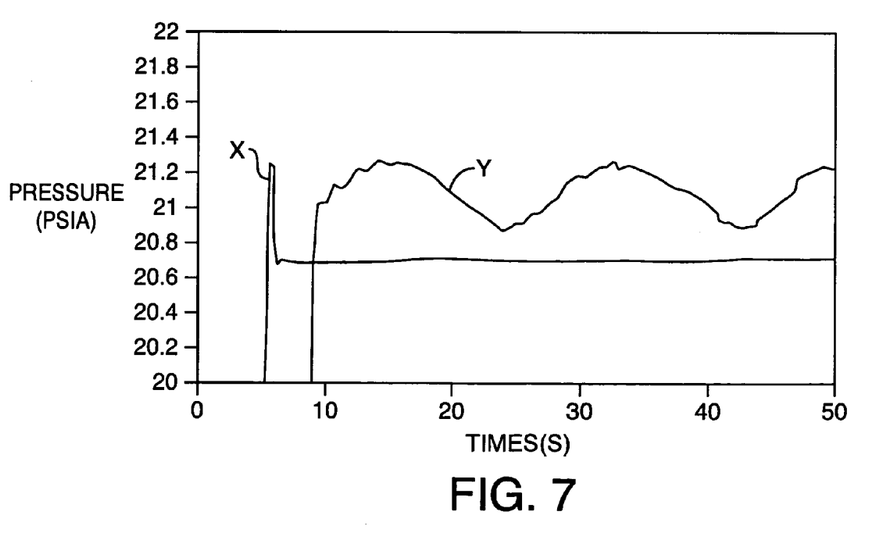

As an example of a use for the system of the present disclosure, FIG. 3 shows the pneumatic control system 100 of FIG. 1 connected to a rotary union 18 of carrier head 16 of a CMP machine 10. The carrier head 16 independently rotates about its own axis, and has a carrier drive shaft 12 connecting a rotation motor 14 to the carrier head 16. The rotary union 18 at the top of the drive motor 14 couples fluid lines $F_i$ to channels $C_i$ in the drive shaft 12 where i=1 to N, corresponding to the number of remote zones $Z_i$. The channels $C_i$ are in turn connected respectively to the remote zones $Z_i$ contained in the carrier head 16.

Although not explicitly shown, the remote zones $Z_i$ of the carrier head 16 are formed at least in part by resilient bladders which expand upon the zones $Z_i$ being pressurized and which contract upon a vacuum being created within the zones $Z_i$. For example, pressurizing a zone $Z_i$ in the carrier head 16 can be used to press a substrate against a rotating polishing pad, while creating a vacuum in the zone $Z_i$ can be used to provide suction for holding the substrate against the carrier head 16 during transfer of the substrate to and from the polishing pad. Furthermore, the pressure in each zone $Z_i$ can be controlled such that the polishing pad applies a desired force of the substrate held by the carrier head 16. The pneumatic control system 100 connects the fluid lines $F_i$ extending from the rotary coupling 18 to the vacuum source 30 and the pressure source 40, and the control device 130 of the system 100 is programmed to operate the controllable valves 112, 116 to alternatively connect the remote zones $Z_i$ of the carrier head 16 to the vacuum source 30 and the pressure source 40 and, thus, pneumatically power the carrier head 16.

One problem associated with a pneumatic control system of the prior art is that the system relies solely on the pressure measured by the transducers 114 placed in the flow control lines $b_i$ of the manifold 110. The transducers 114 in the flow control lines $b_i$, however, can only measure the pressure in those lines and not in the remotely connected zones $Z_i$ of the carrier head 16. As a result, the control system 130 assumes that the pressures in the flow control lines $b_i$ are the same as that in the remotely connected zones $Z_i$ of the carrier head 16. Such is clearly not the case when localized pressure transients occur in the flow control lines $b_i$, which can lead to severe degradation of system performance.

The present disclosure provides a new and improved pressure control system 100, which can be used for, but is not limited to, pressurizing and evacuating remotely connected zones $Z_i$ of semiconductor processing equipment, such as a CMP carrier head 16 for example, and that compensates for pressure measurements taken in the flow control lines $b_i$ remotely connected to the zones $Z_i$. The new and improved pneumatic control system 100 can be used for pressurizing and evacuating a multi-zone system where the number of zones $Z_i$ can vary from i=1 to i=N. In addition, the new and improved pneumatic control system 100 can be used with remotely connected zones $Z_i$ possessing rigid or flexible walls, and that are coupled or non-coupled to each other.

The coupling between the various zones $Z_i$ can occur in three ways. Volumetric coupling at the zone occurs due to the volume expansion/contraction and volume-to-volume interaction. The interaction, for example, would occur by one zone expanding and pushing against another zone thereby increasing pressure within the second zone. In this case, the zone walls are flexible (and can expand and contract).

Outlet coupling at the exhaust occurs if the vacuum pressure level drifts causing outlet flows to change and in extreme cases results in flows transitioning between choked and unchoked. This is especially critical in the case of a venturi pump with high flow being dumped into the venturi line. In this case, the zone walls may be rigid or flexible.

Inlet coupling occurs if the set point in one zone is set sufficiently high such that there is a significant in-rush of flow into its manifold resulting in a drop of line pressure (transient behavior). This line pressure drop would affect all the other zones fed by the source. Again, the zone walls may be rigid or flexible.

It should be noted that a system with only one zone and rigid walls would be considered as a "non-coupled, single-zone system." Multiple instances of such a rigid zone that are fed by independent inlets and that dump into independent exhausts would be an example of a "non-coupled, multi-zone system." A single zone with flexible walls that can expand or contract would be considered to be a "coupled, single-zone system." The system 100 represented in FIGS. 1 and 2 is a "coupled, multi-zone system," where the level of coupling can be quantified based on inlet, outlet, and volumetric coupling.

The zone pressure estimator 120 is used to estimate the pressure in each of the zones $Z_i$ by using the pressure measurements of the transducers 114 in the system manifold 110, the physical parameters of the system 100, and a model-based algorithm to accurately estimate the pressure of the zones $Z_i$. As a direct consequence, a control system 100 that uses the zone pressure estimator 120 in a closed loop for controlling the pressure in the zones $Z_i$ overcomes localized pressure transients in the system manifold 110 that may not occur in the zones $Z_i$ themselves and, therefore, has significantly improved closed-loop control performance.

In addition, the zone pressure estimator 120 easily integrates into an advanced control system, and compensates for multiple zones $Z_i$ that exhibit static and/or dynamic coupling of inlet pressure/flow, outlet pressure/flow, and zone volume interaction. The zone pressure estimator 120 places no restrictions on the size of the remotes zones $Z_i$. The zone pressure estimator 120 also can be used with zones $Z_i$ that have fixed/rigid walls as well as zones with flexible walls. The zone pressure estimator 120 is valid for different ranges of pressure set points and, when incorporated into an advanced control system, will ensure consistent transient and steady-state behavior.

The model-based algorithm used to operate the zone pressure estimator 120 is based upon the dynamics of the system manifold 110, and the dynamics and volumetric coupling of the remote zones $Z_i$.

System Manifold Dynamics

The effective pressure inside each flow line $b_i$ of the system manifold 110 is defined as:

$$\frac{dP_{b,i}}{dt} = \frac{P_{STP}}{V_{b,i}}(Q_{in,i} - Q_{o,i} - Q_{z,i}) \forall\, i = 1, 2, \ldots, N, \quad (1)$$

where $P_{b,i}$ is the pressure measured by the transducer 114 in the measurement chamber for the $i^{th}$ zone, $P_{STP}$ is the pressure at standard temperature and pressure (STP) conditions, $Q_{in,i}$ denotes the input flow and $Q_{o,i}$ and $Q_{z,i}$ denote the output flows. Specifically, $Q_{o,i}$ is the flow from the $i^{th}$ flow line $b_i$ to the venturi manifold, and $Q_{z,i}$ is the flow to the $i^{th}$ zone. In (1), $V_{b,i}$ denotes the flow line $b_i$ volume for the $i^{th}$ zone.

The output flow to the venturi manifold "man" can be represented as:

$$Q_{o,i} = f(P_{b,i}, P_{man}, d_{orifice,i}) \forall\, i=1,2,\ldots, N, \quad (2)$$

where $d_{orifice,i}$ denotes the diameter of the fixed orifice in the measurement flow line $b_i$ that feeds the venturi manifold and $P_{man}$ denotes the pressure in the venturi manifold connected to the vacuum pump 30. It should be noted that the flow through the orifice may be choked or unchoked depending on the pressure differential across the fixed orifice.

Zone Dynamics and Volumetric Coupling

The flow to each zone $Z_i$ can be described by the following dynamic equation (derived from the Navier-Stokes equations):

$$\frac{dQ_{z,i}}{dt} = (P_{b,i} - P_{z,i})C_{tube,i} - \frac{Q_{z,i}}{\tau_{tube,i}} \forall i = 1, 2, \ldots, N, \quad (3)$$

where $Q_{z,i}$ and $P_{z,i}$ denote the inlet flow to and the pressure in the $i^{th}$ zone, respectively, and $C_{tube,i}$ and $\tau_{tube,i}$ are constants associated with the tubing from measurement flow line b to the zone $Z_i$.

The pressure dynamics within each zone $Z_i$ can be described as follows:

$$\frac{dP_{z,i}}{dt} = \frac{P_{STP}}{V_{z,i}} Q_{z,i} - \frac{P_{z,i}}{V_{z,i}} \frac{dV_{z,i}}{dt}, \quad (4)$$

where the volume of each zone $Z_i$ is denoted by $V_{z,i}$ and the dynamic volume interaction due to the coupling between the multiple zones $Z_i$ can be mathematically described as follows:

$$\tau_v \frac{dV_{z,i}}{dt} + V_{z,i} = \left[ V_{z0,i} + \gamma_{ii}(P_{z,i} - P_{STP}) + \sum_{i \neq j} \gamma_{ij}(P_{z,i} - P_{zj}) \right], \quad (5)$$

where $V_{z0,i}$ is the initial volume of each zone under standard temperature and pressure (STP) conditions, $\tau_v$ is the volume expansion/contraction time constant, and $\gamma_{ii}$ represents the expansion/contraction coefficient, and $\gamma_{ij}$ represents the coupling coefficient between zone i and zone j. It should be noted that mass/inertial effects are assumed to be negligible (hence, there is no acceleration term).

Zone Pressure Estimator

The control objective is to regulate the pressures within the remote zones $Z_i$. However, the pressure transducer 114 is housed in the flow line b of the system manifold 110 (as opposed to the zone). As seen in FIG. 1, the system manifold 110 is separated from the remote zones $Z_i$ by long tubes $F_i$.

One solution is to rewrite the zone flow equation (3) in its discrete form:

$$\hat{Q}_{z,i}^{(n)} = \frac{\hat{Q}_{z,i}^{(n-1)} + \Delta t C_{pipe,i}(P_{b,i}^{(n)} - \hat{P}_{z,i}^{(n-1)})}{\left(1 + \frac{\Delta t}{\tau_{pipe,i}}\right)} \quad (6)$$

where $Q_{z,i}^{(n)}$ denotes the $n^{th}$ sample of the flow estimate to the $i^{th}$ zone. It should be noted that $P_b$ is the pressured measured by the flow line pressure transducer 114.

A discrete solution for the expression in (5) is then obtained as follows:

$$\hat{V}_{z,i}^{(n)} = \frac{\hat{V}_{z,i}^{(n-1)} + \frac{\Delta t}{\tau_v}\left[V_{z0,i} + \gamma_{ii}(\hat{P}_{z,i}^{(n-1)} - P_{STP}) + \sum_{i \neq j} \gamma_{ij}(\hat{P}_{z,i}^{(n-1)} - \hat{P}_{z,j}^{(n-1)})\right]}{\left(1 + \frac{\Delta t}{\tau_v}\right)}, \quad (7)$$

where $V_{z,i}^{(n)}$ denotes the $n^{th}$ sample of the volume estimate to the $i^{th}$ zone. Based on equations (4), (6) and (7), the algorithm of the pressure estimator 120 is constructed as follows:

$$\hat{P}_{z,i}^{(n)} = \hat{P}_{z,i}^{(n-1)} + \Delta t \left( \frac{P_{STP}}{\hat{V}_{z,i}^{(n)}} \hat{Q}_{z,i}^{(n)} + \frac{\hat{P}_{z,i}^{(n-1)}}{\tau_v \hat{V}_{z,i}^{(n)}} \left[ \hat{V}_{z,i}^{(n)} - V_{z0,i} - \gamma_{ii}(\hat{P}_{z,i}^{(n-1)} - P_{STP}) - \sum_{i \neq j} \gamma_{ij}(\hat{P}_{z,i}^{(n-1)} - \hat{P}_{z,j}^{(n-1)}) \right] \right), \quad (8)$$

where $P_{z,i}^{(n)}$ denotes the nth sample of a pressure estimate of the $i^{th}$ zone, $Q_{z,i}^{(n)}$ is obtained from the flow estimate defined in (6) or can be replaced by the direct flow measurement $Q_z$ when available, and $V_{z,i}^{(n)}$ is obtained from (7).

For a fixed volume (i.e., rigid walls) that by construction does not exhibit volume expansion and hence, exhibits no volumetric coupling $\gamma_{ij}=0 \forall i, j=1,2,\ldots,N$. As a result, the expression in (5) reduces to $V_{z,i}=V_{z0,i}$ and $V_{z,i}^{(n)}=V_{z0,i} \forall n$. Thus, from (8), the estimated pressure $P_{z,i}^{(n)}$ for a fixed volume with rigid walls can be rewritten as follows:

$$\hat{P}_{z,i}^{(n)} = \hat{P}_{z,i}^{(n-1)} + \Delta t \frac{P_{STP}}{V_{z0,i}} \hat{Q}_{z,i}^{(n)} \quad (9)$$

It should be noted that the discrete implementations of the estimator equations may be explicit or implicit and do not have any discernable impact on system performance so long as the discrete implementations satisfy well-known stability conditions.

Control Algorithm

To validate the performance of the zone pressure estimator 120, the calculations defined in (6), (7), and (8) were integrated into a control algorithm programmed into the zone pressure estimator 120 and the following experiments were performed using the system 100 shown in FIG. 1, and a system constructed in accordance with the prior art (i.e., not including the zone pressure estimator 120). From FIGS. 4 through 7, it is clearly shown that the steady-state performance, as represented by lines "X" of the estimator-based control device 100 of FIG. 1 is significantly better than the steady-state performance, as represented by lines "Y" of a system constructed in accordance with the prior art for a range of volumes and pressure set points in that, the estimator-based control device 100 produces negligible oscillations and much smaller steady-state offset.

An example of the system parameters for remote zones $Z_i$ connected to respective measurement chambers by a tube length of 1.2 m with a 4 mm inner diameter for $N_2$ (nitrogen) are listed below:

| | | |
|---|---|---|
| $P_{STP}$ = | 14.7 psia | pressure at STP conditions |
| $\rho_{STP}$ = | 1.16 kg/m³ | density at STP conditions |
| $\gamma$ = | 1.4 | specific heat ratio |
| $T_I$ = | 300° K | operating temperature |
| R = | 297 J/kg-K | ideal gas constant |
| $\mu$ = | 1.77 × 10⁻⁴ poise | coefficient of viscosity |
| $C_{tube}$ ≈ | 65400 kg/cc | tube parameter |
| $\tau_{tube}$ ≈ | 3 ms | tube time constant |

The control device 130 is connected to the valves 112, 116 of the lines $b_i$, the zone pressure estimator 120 and a second input device, such as the control device 20 of the CMP machine 10. In general, the control device 130 is programmed to, receive the nth pressure set point for each of the i zones from the second input device 20, receive the nth sample of the zone pressure estimate for each of the i zones from the zone pressure estimator 120, and compare the nth pressure set point for each of the i zones to the nth sample of the zone pressure estimate, and, if the sample does not equal the set point, operate the valves 112, 116 until the sample equals the set point.

The present disclosure, therefore, provides a new and improved pneumatic control system 100 that can be used for, but is not limited to, pressurizing and evacuating remotely connected volumes of semiconductor processing equipment, such as a CMP carrier head 10 for example, and that compensates for pressure measurements taken in chambers remotely connected to the volume. In addition, the pneumatic control system 100 of the present disclosure can be used for pressurizing and evacuating a multi-volume system were the number of volumes or zones can vary from i=1 to i=N, wherein the zones possess rigid or flexible walls, and wherein the zones are coupled or not coupled to each other.

It should be understood that the present disclosure is directed to the pneumatic control system 100 that can be used with or as part of a CMP machine. The pneumatic control system 100 of the present disclosure, however, is not limited to being used with or part of a CMP machine, and the pneumatic control system 100 can be used with remote zones of pneumatically operated machines, devices or uses, other than a CMP machine.

The exemplary embodiments described in this specification have been presented by way of illustration rather than limitation, and various modifications, combinations and substitutions may be effected by those skilled in the art without departure either in spirit or scope from this disclosure in its broader aspects and as set forth in the appended claims.

What is claimed is:

1. A system for controlling fluid flow through i lines, wherein the i lines are connectable through tubing to i zones, respectively, and wherein i=1, 2, . . . , N, the system comprising:
   at least one valve in each of the i lines;
   a pressure transducer operatively connected to each of the i lines;
   a first input device for receiving properties of the system;
   a zone pressure estimator connected to the pressure transducers and the first input device and programmed to, for each of the i lines, receive a measured pressure in the flow line i from the pressure transducer, receive from the first input device properties of the system, and calculate a pressure estimate of the zone i;
   a second input device for receiving a pressure set point for each of the i zones,
   a control device connected to the valves of the lines i, the zone pressure estimator and the second input device, and programmed to,
      receive the pressure set point for the zone i from the second input device,
      receive the pressure estimate of the zone i from the zone pressure estimator, and
      compare the pressure set point for the zone i to the pressure estimate of the zone i, and, if the estimate does not equal the set point, operate the valve of the lines i until the estimate equals the set point.

2. A system according to claim 1, further comprising a pressure manifold connected to inlets of the i lines.

3. A system according to claim 1, further comprising a vacuum manifold connected to outlets of the i lines.

4. A system according to claim 1, wherein the valve of each of the i lines includes an inlet valve for connecting a pressure source with the line and an outlet valve for connecting a vacuum source with the line, and wherein the control device is connected to the inlet valves and the outlet valves and is programmed to operate the inlet and the outlet valves of the lines i until the pressure estimates equal the pressure set points.

5. A system according to claim 4, further comprising a pressure source connected to the inlet valves.

6. A system according to claim 5, further comprising a pressure manifold connecting the pressure source to the inlet valves.

7. A system according to claim 4, further comprising a vacuum source connected to the outlet valves.

8. A system according to claim 7, further comprising a vacuum manifold connecting the vacuum source to the outlet valves.

9. A system according to claim 8, wherein the vacuum manifold includes a venturi.

10. A system according to claim 1, wherein the i zones have rigid walls.

11. A system according to claim 1, wherein the i zones have flexible walls.

12. A system according to claim 1, wherein the i zones are coupled.

13. A system according to claim 1, wherein the i zones are non-coupled.

14. A system according to claim 1, wherein the first input device comprises a keyboard.

15. A machine including the system of claim 1 and further including i zones connected through the tubing to the i lines, respectively, wherein i=1, 2, . . . ,N.

16. A machine according to claim 15, further comprising a machine control device connected to the second input device and programmed to provide the pressure set point for each of the i zones of the machine.

17. A machine according to claim 15, further comprising a CMP carrier head containing the i zones.

18. A machine according to claim 17, wherein the zones of the carrier head are formed at least in part by flexibly resilient bladders.

19. A machine according to claim 18, wherein the zones of the carrier head press against one another.

20. A system according to claim 1, wherein the properties of the system include constants ($C_{tube,i}$ and $\tau_{tube,i}$) associated with the tubing connecting the line i to the zone i a volume ($V_{z,i}$) of each zone i an initial volume ($V_{z0,i}$) of each zone i under STP conditions, a volume expansion/contraction time constant ($\tau_v$), an expansion/contraction coefficient ($\gamma_{ii}$) of zone i, and a coupling coefficient ($\gamma_{ij}$) between zone i and zone j.

21. A system according to claim 20, wherein the pressure estimator is programmed to calculate an nth sample of the pressure estimate of the zone i, $\hat{P}_{z,i}^{(n)}$, where n is time dependent and, $$\hat{P}_{z,i}^{(n)} = \hat{P}_{z,i}^{(n-1)} + \Delta t \left( \frac{P_{STP}}{\hat{V}_{z,i}^{(n)}} \hat{Q}_{z,i}^{(n)} + \frac{\hat{P}_{z,i}^{(n-1)}}{\tau_v \hat{V}_{z,i}^{(n)}} \left[ \hat{V}_{z,i}^{(n)} - V_{z0,i} - \gamma_{ii}(\hat{P}_{z,i}^{(n-1)} - P_{STP}) - \sum_{i \neq j} \gamma_{ij}(\hat{P}_{z,i}^{(n-1)} - \hat{P}_{i,j}^{(n-1)}) \right] \right),$$

$$\hat{Q}_{z,i}^{(n)} = \frac{\hat{Q}_{z,i}^{(n-1)} + \Delta t C_{pipe,i}(P_{b,i}^{(n)} - \hat{P}_{z,i}^{(n-1)})}{\left(1 + \frac{\Delta t}{\tau_{pipe,i}}\right)},$$

and $\hat{V}_{z,i}^{(n)} = \dfrac{\hat{V}_{z,i}^{(n-1)} + \dfrac{\Delta t}{\tau_v}\left[V_{z0,i} + \gamma_{ii}(\hat{P}_{z,i}^{(n-1)} - P_{STP}) + \sum_{i \neq j} \gamma_{ij}(\hat{P}_{z,i}^{(n-1)} - \hat{P}_{z,j}^{(n-1)})\right]}{\left(1 + \dfrac{\Delta t}{\tau_v}\right)}$, and where $P_b$ is the measured pressure, and wherein the control device is programmed to receive an nth pressure set point for each of the i zones from the second input device, receive the nth sample of the pressure estimate for each of the i zones from the zone pressure estimator, and compare the nth pressure set point for each of the i zones to the nth sample of the pressure estimate of the zone i, and, if the nth sample does not equal the nth set point, operate the valve until the sample equals the set point.

22. A method for controlling fluid flow through i lines, wherein the i lines are connectable through tubing to i zones, respectively, and wherein i=1, 2, ..., N, the method comprising for each line i:

receiving a measured pressure in the flow line i;
receiving properties of the tubing in the zone i connected to the flow line i;
calculating a pressure estimate of the zone i based upon the properties of the tubing in the zone i and measured pressure in the flow line i;
receiving a pressure set point for each of the i zones; and comparing the pressure set point for each of the i zones to the pressure estimate for each of the i zones, and, if the pressure estimate does not equal the set point, modifying flow through the flow line i until the pressure estimate equals the set point.

23. A method according to claim 22, wherein the i zones have rigid walls.

24. A method according to claim 22, wherein the i zones have flexible walls.

25. A method according to claim 22, wherein the i zones are coupled.

26. A method according to claim 22, wherein the i zones are non-coupled.

27. A method according to claim 22, wherein the properties of the system include constants ($C_{tube,i}$ and $\tau_{tube,i}$) associated with the tubing connecting the lines to the zones i, a volume ($V_{z,i}$) of each zone, an initial volume ($V_{z0,i}$) of each zone under STP conditions, a volume expansion/contraction time constant ($\tau_v$), an expansion/contraction coefficient ($\gamma_{ii}$) of zone i, and a coupling coefficient ($\gamma_{ij}$) between zone i and zone j.

28. A method according to claim 27, wherein an nth sample of a pressure estimate of the zone i, $\hat{P}_{z,i}^{(n)}$ is calculated, where n is time dependent and, $$\hat{P}_{z,i}^{(n)} = \hat{P}_{z,i}^{(n-1)} + \Delta t \left( \frac{P_{STP}}{\hat{V}_{z,i}^{(n)}} \hat{Q}_{z,i}^{(n)} + \frac{\hat{P}_{z,i}^{(n-1)}}{\tau_v \hat{V}_{z,i}^{(n)}} \left[ \hat{V}_{z,i}^{(n)} - V_{z0,i} - \gamma_{ii}(\hat{P}_{z,i}^{(n-1)} - P_{STP}) - \sum_{i \neq j} \gamma_{ij}(\hat{P}_{z,i}^{(n-1)} - \hat{P}_{i,j}^{(n-1)}) \right] \right),$$

$$\hat{Q}_{z,i}^{(n)} = \frac{\hat{Q}_{z,i}^{(n-1)} + \Delta t C_{pipe,i}(P_{b,i}^{(n)} - \hat{P}_{z,i}^{(n-1)})}{\left(1 + \frac{\Delta t}{\tau_{pipe,i}}\right)},$$

and $\hat{V}_{z,i}^{(n)} = \dfrac{\hat{V}_{z,i}^{(n-1)} + \dfrac{\Delta t}{\tau_v}\left[V_{z0,i} + \gamma_{ii}(\hat{P}_{z,i}^{(n-1)} - P_{STP}) + \sum_{i \neq j} \gamma_{ij}(\hat{P}_{z,i}^{(n-1)} - \hat{P}_{z,j}^{(n-1)})\right]}{\left(1 + \dfrac{\Delta t}{\tau_v}\right)}$, and where $P_b$ is the measured pressure, and an nth pressure set point for each of the i zones is received and the nth pressure set point for each of the i zones is compared to the nth sample of the pressure estimate of the zone i, and, if the nth sample does not equal the nth set point, flow through the flow line is modified until the sample equals the set point.

29. A system for remotely controlling pressure within each of i zones by controlling corresponding pressure within each of i lines respectively connectable to the i zones, wherein i= 1, 2, . . . , N, the system comprising:
- at least one control valve connected to control the flow of fluid through each line;
- a pressure transducer connected to measure the pressure in each line;
- a zone pressure estimator connected to each pressure transducer and programmed to, for each of the i lines, receive a measured pressure in the flow line $i$ from the pressure transducer, and calculate an estimated pressure within the zone i as a function of predetermined characteristics of the system and the measured pressure provided by the pressure transducer; and
- a control device connected to each valve of the corresponding line i and the zone pressure estimator and programmed to operate the valve so as to control the flow of fluid in the corresponding line i as a function of a pressure set point and the estimated pressure within the zone i from the zone pressure estimator.

30. A machine including the system of claim 29 and further including i zones respectively connected to the i lines.

31. A machine according to claim 29, further comprising a machine control device connected to the control device and programmed to provide the pressure set point for each of the i zones of the machine.

32. A machine according to claim 31, further comprising a CMP carrier head containing the i zones.

33. A machine according to claim 32, wherein the zones of the carrier head are formed at least in part by flexibly resilient bladders.

34. A machine according to claim 33, wherein the zones of the carrier head press against one another.

35. A method associated with system for remotely controlling pressure within each of i zones by controlling corresponding pressure within each of i flow lines respectively connectable to the i zones, wherein i=1, 2, . . . , N, comprising:
- controlling the flow of fluid through each line with at least one control valve;
- measuring the pressure in each line;
- calculating an estimated pressure within the zone i as a function of predetermined characteristics of the system and the measured pressure in the corresponding flow line i; and
- operating the valve so as to control the flow of fluid in the corresponding flow line i as a function of a set point and the estimated pressure within the zone i.

* * * * *